(12) United States Patent
Plagemann et al.

(10) Patent No.: US 9,501,151 B2
(45) Date of Patent: Nov. 22, 2016

(54) SIMULTANEOUS MULTI-USER MARKING INTERACTIONS

(71) Applicant: Google Inc., Mountain View, CA (US)

(72) Inventors: Christian Plagemann, Palo Alto, CA (US); Alejandro Kauffmann, San Francisco, CA (US)

(73) Assignee: Google Inc., Mountain View, CA (US)

( * ) Notice: Subject to any disclaimer, the term of this patent is extended or adjusted under 35 U.S.C. 154(b) by 357 days.

(21) Appl. No.: 13/765,884

(22) Filed: Feb. 13, 2013

(65) Prior Publication Data
US 2015/0169066 A1    Jun. 18, 2015

(51) Int. Cl.
G06F 3/048    (2013.01)
G06F 3/01    (2006.01)
G06Q 30/06    (2012.01)

(52) U.S. Cl.
CPC ............... *G06F 3/017* (2013.01); *G06F 3/011* (2013.01); *G06Q 30/06* (2013.01)

(58) Field of Classification Search
USPC .................. 345/156, 157, 676; 715/728, 753
See application file for complete search history.

(56) References Cited

U.S. PATENT DOCUMENTS

| 5,737,619 | A * | 4/1998 | Judson ........................... 715/236 |
| 6,071,123 | A * | 6/2000 | Tallal et al. ................... 434/116 |
| 8,180,114 | B2 | 5/2012 | Nishihara et al. |
| 8,527,588 | B2 * | 9/2013 | Beck et al. .................... 709/204 |
| 8,624,932 | B2 * | 1/2014 | Hildreth et al. ............... 345/676 |
| 2004/0004633 | A1 * | 1/2004 | Perry et al. .................... 345/728 |
| 2009/0138805 | A1 * | 5/2009 | Hildreth ............. G06K 9/00335 715/745 |
| 2010/0205667 | A1 | 8/2010 | Anderson et al. |
| 2010/0207874 | A1 * | 8/2010 | Yuxin ..................... G06F 3/017 345/156 |
| 2010/0333123 | A1 * | 12/2010 | Mehta .................... H04H 60/37 725/13 |
| 2011/0026765 | A1 | 2/2011 | Ivanich et al. |
| 2011/0197263 | A1 | 8/2011 | Stinson, III |
| 2012/0268372 | A1 | 10/2012 | Park et al. |
| 2012/0321275 | A1 | 12/2012 | Sly et al. |
| 2013/0091419 | A1 * | 4/2013 | Caliman et al. ............. 715/236 |
| 2013/0132837 | A1 | 5/2013 | Mead et al. |
| 2014/0009378 | A1 * | 1/2014 | Chew ..................... G06F 3/017 345/156 |

* cited by examiner

*Primary Examiner* — Matthew Ell
(74) *Attorney, Agent, or Firm* — Fish & Richardson P.C.

(57) ABSTRACT

A method to provide simultaneous interaction with content while not disturbing the content being provided is disclosed. Content may be provided to a group of users. At least one of the users may make a gesture. The gesture may be associated with a user identifier and with a content identifier. An event may be stored based on the gesture from the at least one of the users, the user identifier, and the content identifier. The event may be selected from the group consisting of: a vote, a purchase decision, a modification of content, an adjustment of a device setting, or a bookmark. A notice may be provided to the at least one user to indicate that the action requested by the gesture was performed.

14 Claims, 3 Drawing Sheets

SIMULTANEOUS MULTI-USER MARKING INTERACTIONS

BACKGROUND

Gesture-based interaction with content on a screen has been utilized by a variety of systems, such as video game consoles, for device control. For example, a user may play a boxing video game and make a gesture such as throwing a punch. The video game console may receive the gesture and cause a predefined animated sequence of the user's character in the video game throwing a punch to be displayed. Thus, a single user may interact with content on a monitor to have a function performed.

BRIEF SUMMARY

According to an implementation of the disclosed subject matter, content may be rendered to a group of users. A gesture may be received from at least one of the users in the group. The gesture may be active, such as a thumbs-up motion, or passive, such as leaning toward a monitor for a predetermined amount of time. The gesture may be associated with a user identifier and a content identifier. An event may be stored based on the gesture received from the at least one of the users, the user identifier, and the content identifier. The event may be, for example, a vote, a purchase decision, a modification of content, an adjustment of a device setting, or a bookmark. In some configurations, one of the individuals in the group may have exclusive control of the content that is presented or rendered. A notice, such as an email or text message, may be sent to the user that made the gesture.

In an implementation, a system is provided that includes a database and a processor connected to the database. The database may, for example, store an event. The processor may be configured to provide content to a group of users and receive a gesture from at least one of the group of users. The gesture may be associated with a user identifier and with a content identifier. The processor may be configured to store the event to the database based on the gesture from at least one of the plurality of users, the user identifier, and the content identifier, where the event is selected from the group consisting of: a vote, a purchase decision, a modification of content, an adjustment of a device setting, or a bookmark.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Methods and systems are provided that detect multiple users and register their simultaneous interactions with content. An interaction with content may be, for example, a vote, a purchase decision, modifying content, or a bookmark. For example, multiple individuals may be listening to music. A single person may make a gesture. The gesture may be detected, the user identified, the content identified, and the gesture may be converted into a command that is registered. For example, the person may desire to have a song being played on a stereo added to the user's playlist.

According to an implementation, multiple co-located people simultaneously viewing a shared screen may indicate individual preferences or initiate personalized actions relative to the content on the screen without diminishing other users' experiences. For example, three individuals may be watching television on a monitor. In some configurations, a first user may have exclusive control over what channel is selected. For example, the first user may have possession of the television remote control. The other two individuals may, however, disagree over the quality of the content shown on the television. The second user may particularly enjoy the television show being shown on the screen. That user may make a thumbs-up gesture. The gesture may be detected by one or more cameras located in the room and the thumbs-up, which may be construed by the system as an up-vote, may be associated with the second user who may be identified by, for example, facial recognition. The third user, however, may dislike what is shown. The third user may make a thumbs-down gesture concurrent with the second user's gesture. The third user's gesture may be recognized and associated with the third user, similar to that of the second user. The first user's viewing of the television show is undisturbed by the actions of the second and third users. A notice may be sent to the second or third user to inform them that the action requested by their respective gestures was taken. Examples of a notice may include an email or a text message. The notice also may appear briefly on the monitor. A notice may be external to the monitor. For example, a LED connected to a depth camera may blink to indicate that a gesture was recognized and the corresponding action was executed.

Figure 1:
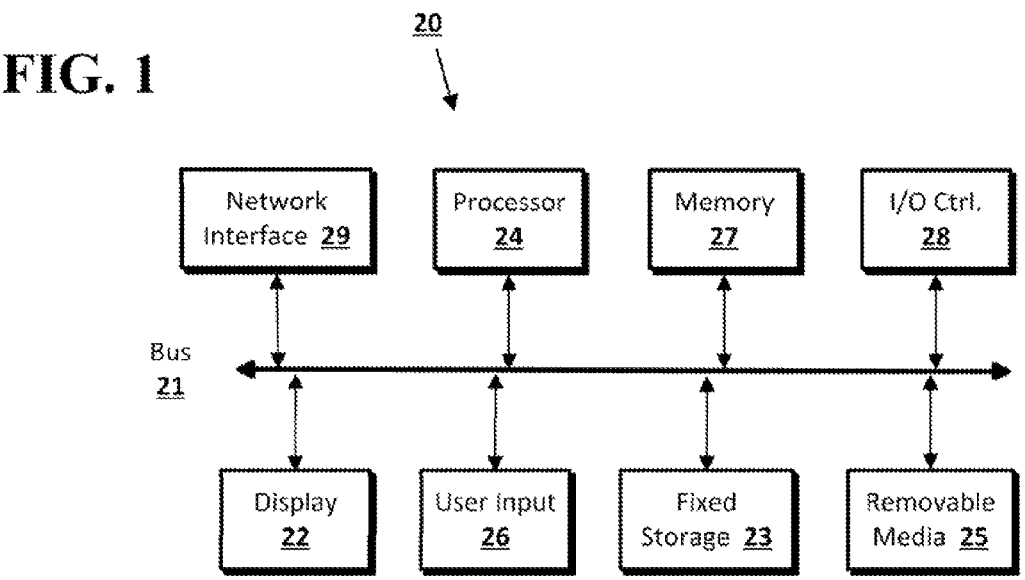
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
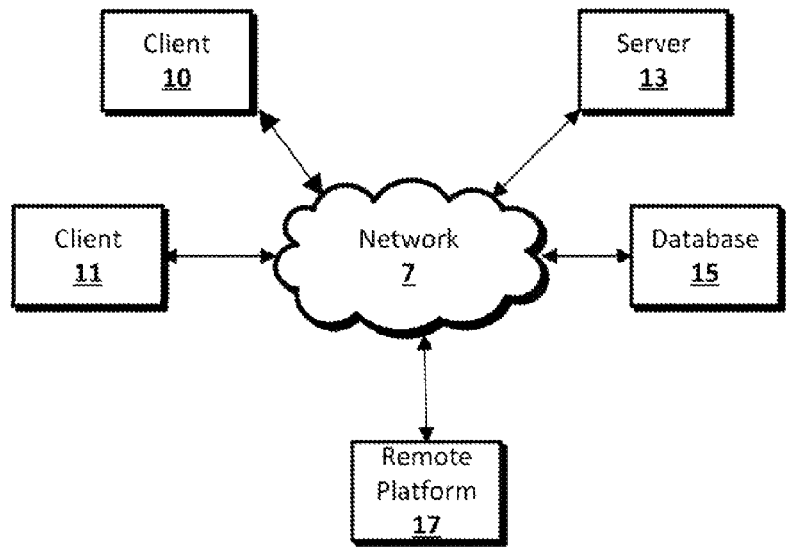
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
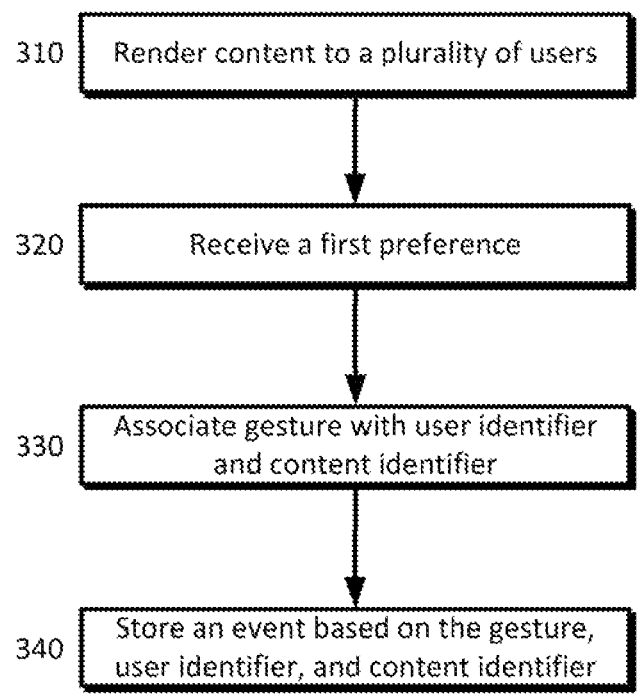
FIG. 3 shows an example process for simultaneous marking of content according to an implementation of the disclosed subject matter.

In an implementation, shown in FIG. 3, content may be rendered to a plurality of users at 310. Content may be provided by, for example, a computing device, a monitor, or a speaker. For example, a television monitor or a jukebox may provide content according to implementations disclosed herein. Content may refer to a picture, a multimedia file such as a movie, a video, an audio file such as a song, or text such as a news article.

A gesture may be received from at least one of the plurality of users at 320. Examples of a gesture may include movement of a hand, a finger, an eye, an appendage, or an object (e.g., a pointer or wand). A gesture may be described as an active gesture, such as a thumb-up gesture, or a passive gesture, such as leaning toward a monitor for a predetermined amount of time. Active gesture may refer to a gesture that a user consciously makes while a passive gesture may be based on an interpretation of a user's actions.

One or more cameras may be used to detect a gesture. For example, a camera may capture a series of images from an area such as a living room. The images may be processed to determine if a user is present in the living room and whether or not the movements of the user could constitute a gesture. In some configurations, multiple cameras may be deployed in a space and those cameras may be connected to a local or remote computing device that processes the images received for gesture information. The series of images may be compared to a library of known commands that contains example of movements that the system is capable of recognizing. For example, one gesture may be a thumbs-up motion. That gesture may be associated with an action, such as registering a vote for content or adding a song to a playlist, in a database.

A camera may also be used to recognize the presence of users and connect the identified user with an account that the user may have. For example, a database may contain one or more images of one or more users. The images may be used to identify a user based on, for example, body type, facial recognition, or a signature gesture. A signature gesture may be a predefined gesture that uniquely identifies a user. For example, it may be a hand wave motion in a specific pattern. A user may also be identified based on a voice command. For example, the user may speak a voice signature that identifies the particular user. The user may continue to be tracked by voice and/or by cameras that track the user's body and/or face. A user's voice may also be recognized as well irrespective of a command.

The gesture may be associated with a user identifier and with a content identifier at 330. A user identifier may refer to a user account. A user identifier may refer to an indication of who the user is that issued the command or gesture. As described above, a user may be identified in a variety of ways including, for example: a voice recognition, a facial recognition, a retina recognition, a body recognition, an iris recognition, a behavioral recognition, a user-specific gesture, or any combination thereof. A behavioral recognition may be based on a pattern of behavior specific to an individual user (e.g., a mannerism). A user-specific gesture may be a gesture created by the user to identify herself or himself. The gesture may be stored to a database and associated with the user's account. A user may be identified using a non-gesture method as well such as a keyboard and mouse. A user identifier may be stored locally or on a remote server. The user may access the account using a variety of electronic devices such as a mobile phone, computer, or tablet. A user account may be associated with other activities of the user such as a purchase history, a download history, a web browsing history, a favorites (e.g., preferred URLs) list, and a wish list (e.g., items the user has indicated an interest in).

A content identifier may indicate the identity of the content at the time the user performs a gesture. For example, if a user is listening to an album, the content identifier may include the name of the album, artist, and song. Information about the content identifier may be obtained from the source material or medium by which the content is provided. For example, a CD may contain information about the album, artist, and song titles contained therein. In some configurations, a user may provide the information through, for example, ID3 tags or album art. Similarly, DVDs may supply information about title, chapter breaks, etc. In some instances, a time stamp may be obtained for the content. The system may perform a web-based or database query to determine information it does not possess for the relevant time stamp. For example, a user may view a DVD and, at 35 minutes into the film, make a gesture to indicate that the user would like to purchase the music being played in the background and add it to the user's account. The system, a priori, may not know the identity of the music being played. It may determine what music is being played by processing the music through a sound analysis program or it may perform a web-based query or database search to determine what music is being played at that time in the identified DVD.

An event may be stored based on the gesture received from the one or more users, the user identifier, and the content identifier at 340. For example, a passenger in an airport lounge may be viewing a news story or an ad. The user may make a gesture that bookmarks the content for later. The content may be added to a personal queue for the user's later use or viewing. An event may include, for example, a vote, a purchase decision, a modification of content, an adjustment of a device setting, or a bookmark. For example, the event may be stored to a remote or local database relative to the user. A vote may be refer to an expression of an opinion. The expression may be binary (e.g., a yes or no, a thumbs up or down) or it may be a rating (e.g., a seven out of ten, a percentage). A purchase decision may be, for example, downloading content or marking content to be purchased (e.g., adding content to a purchase basket/bin). A modification of content, for example, may refer to adding a song to a user's playlist or removing a song from a user's playlist, sending content, capturing content, playing content, uploading content, or posting content. A book mark may include, for example, a URL that is stored.

A notice, such as an email, a text message, a download link, or a webpage, may be sent to the one or more users to indicate that the action requested or performed by the gesture has been performed. For example, if a user requested purchase of a song being played on a jukebox, a notice may be sent to the user's phone via text message. In some configurations, the notice may appear briefly on a monitor. For example, if a user is watching an online video with a group of friends, the user may make a thumbs-up gesture to record a vote on the video being displayed. The vote may be stored to the user's account and a notice may appear on the screen to indicate to the user that the vote has been registered.

Figure 4:
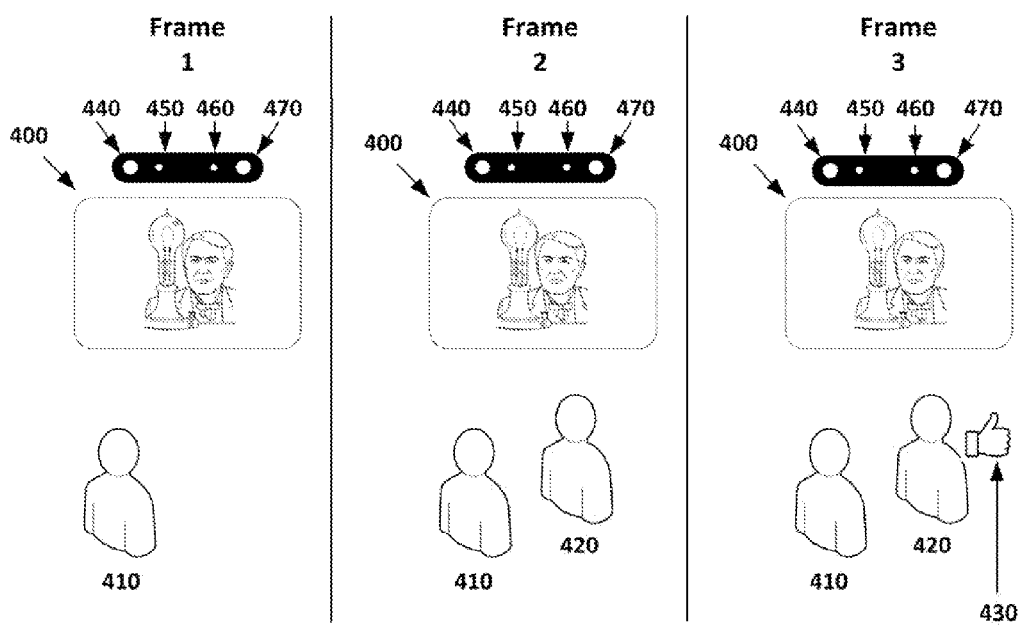
FIG. 4 shows an example of a content marking by a second user according to an implementation disclosed herein.

An example of an implementation disclosed herein is provided in FIG. 4. In Frame 1, a monitor 400 may be displaying content. A first user 410 may be recognized by the first user's face and tracked using an RGB camera 440 and/or depth camera 470. A first LED indicator 450 may indicate the status of the camera tracking system. A second LED indicator may indicate receipt of an event. The first user may be joined by a second user 420 in Frame 2. The second user 420 may make a gesture signature to be identified and tracked. The second user 420, may make a gesture to store information about the content being shown on the monitor 400 in Frame 3. The second LED indicator 460 may briefly blink to indicate to the second user 420 that the gesture to store information about the content has been received and processed. An email containing information about the content on the monitor 400 may be sent to the second user's email account.

In an implementation, a system is provided that includes a database and a processor connected to the database. The database may be configured to store an event. The processor may be configured to provide content to a plurality of users. In some configurations the database may be remote from the processor providing the media (e.g., the database may have a processor and a media-providing device may have its own processor). The processor may be configured to receive a gesture from one or more users. The gestures may be associated with a user identifier and with a content identifier. The processor may be configured to store the event to the database based on the gesture from the one or more users, the user identifier, and the content identifier. The event may be, for example: a vote, a purchase decision, a modification of content, an adjustment of a device setting, or a bookmark.

As an example of the system, a group of friends, Aaron, Bart, and Clay may be viewing photographs of Aaron's vacation to London on a laptop computer. A camera on the laptop may use facial recognition to identify each person. The laptop processor may provide the photos directly on the laptop monitor or to an external monitor. Each person can indicate whether or not they would like a copy of a particular photo with a hand wave gesture. For example, Clay may like a particular picture of Big Ben and make a gesture to store the picture to his account. The gesture may be received by the camera and processed by the laptop processor to determine its meaning. In some configurations, the processor may pass the camera data to a remote location to process the gesture data received by the camera. The processor may determine who of Aaron, Bart and Clay made the gesture (e.g., user identifier) and to what content the gesture was directed (e.g., content identifier). An event representing Clay's desire to receive a copy of the photo from Aaron may be stored to a database. A notice may be sent to Clay to indicate that his request has been received and/or that the photo has been stored to his account. In some configurations, a user may configure security permission to exclude another user from having his or her gesture received by the system. For example, if Aaron did not want to share his photos, he may configure the system to not share the photos unless instructed to do so by Aaron.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
obtaining multiple images that are taken by a camera;
determining that the images show at least one of a plurality of users performing a particular gesture during or immediately after a particular time when particular content was rendered by a first application, wherein the particular content that was rendered by the first application is a first content type of multiple different content types that were simultaneously rendered by the first application at the particular time;
determining a content identifier associated with the particular content that was rendered by the first application at the particular time;
selecting a particular input based at least on (i) the particular gesture, (ii) a user identifier associated with a particular user of the plurality of users that performed the particular gesture, and (iii) the content identifier associated with the particular content that was rendered by the first application at the particular time; and
providing the particular input to another application that identifies a particular content file, from a set of multiple content files, that corresponds to the particular content that was rendered by the first application at the particular time based on the particular input.

2. The computer-implemented method of claim 1, comprising:
accessing, based at least on the particular input, the particular content file associated with the particular content that was rendered by the first application at the particular time; and
providing the particular content file to an account associated with the particular user.

3. The computer-implemented method of claim 2, wherein the particular input comprises an instruction to execute a purchase of the particular content file; and
wherein accessing the particular content file associated with the particular content, and providing the particular content file to an account associated with the particular user comprises accessing, based at least on an instruction to execute a purchase of the particular content file, the particular content file associated with the particular content, and providing the particular content file to an account associated with the particular user.

4. The computer-implemented method of claim 2, comprising:
accessing one or more preferences from an account associated with a second user of the plurality of users; and
wherein accessing, based at least on the particular input, the particular content file associated with the particular content, further comprises accessing, based at least on the particular input and the one or more preferences, the particular content file associated with the particular content.

5. The computer-implemented method of claim 1, wherein determining that the images show at least one of the plurality of users performing the particular gesture during or immediately after a particular time when particular content was rendered by the first application, comprises determining that the images show the at least one of the plurality of users performing the particular gesture during or immediately after a particular time when particular content originating from an account of a second user of the plurality of users was rendered by the first application; and
wherein the application is associated with the account of the second user.

6. The computer-implemented method of claim 1, comprising:
determining that the particular content originates from an account of a second user of the multiple users; and
processing, by the application, the particular input in accordance with settings associated with the second user.

7. A system comprising:
one or more data processing apparatus; and
a computer-readable storage device having stored thereon instructions that, when executed by the one or more data processing apparatus, cause the one or more data processing apparatus to perform operations comprising:
obtaining multiple images that are taken by a camera;
determining that the images show at least one of a plurality of users performing a particular gesture during or immediately after a particular time when particular content was rendered by a first application, wherein the particular content that was rendered by the first application is a first content type of multiple different content types that were simultaneously rendered by the first application at the particular time;

determining a content identifier associated with the particular content that was rendered by the first application at the particular time;

selecting a particular input based at least on (i) the particular gesture, (ii) a user identifier that is associated with a particular user of the plurality of users that performed the particular gesture, and (iii) the content identifier that is associated with the particular content that was rendered by the first application at the particular time; and providing the particular input to another application that selects a rating for the particular content based on the particular input.

8. The system of claim 7 comprising:

determining that the images show a second user of the plurality of users performing a second gesture during or immediately after a particular time when the particular content was rendered by the first application;

selecting a second input based at least on (i) the second gesture, (ii) a user identifier that is associated with the second user of the plurality of users that performed the second gesture, and (iii) the content identifier that is associated with the particular content that was rendered by the first application at the particular time;

providing the second input to the application; and based at least on the particular input and the second input, determining not to modify a rendering of the particular content.

9. The system of claim 7, comprising:

storing data associating the particular user, the particular content, and the rating.

10. The system of claim 9, comprising:

based at least on the rating for the particular content, determining to modify a rendering of the particular content.

11. The computer-implemented method of claim 7, comprising:

providing the particular input to an application that identifies a particular content file, from a set of multiple content files, that corresponds to the particular content that was rendered by the first application at the particular time based on the particular input;

accessing, based at least on the particular input, the particular content file associated with the content; and providing the particular content file to an account associated with the particular user.

12. The computer-implemented method of claim 11, wherein the particular input comprises an instruction to execute a purchase of the particular content file; and wherein accessing the particular content file associated with the particular content, and providing the particular content file to an account associated with the particular user comprises accessing, based at least on an instruction to execute a purchase of the particular content file, the particular content file associated with the particular content, and providing the particular content file to an account associated with the particular user.

13. The computer-implemented method of claim 11, comprising:

accessing one or more preferences from an account associated with a second user of the plurality of users; and wherein accessing, based at least on the particular input, the particular content file associated with the particular content, further comprises accessing, based at least on the particular input and the one or more preferences, the particular content file associated with the particular content.

14. The method of claim 1, wherein the particular time is associated with an amount of time elapsed since rendering of the particular content was initiated by the particular user of the plurality of users that performed the particular gesture.

* * * * *